United States Patent
Obrecht et al.

(10) Patent No.: US 9,476,406 B2
(45) Date of Patent: Oct. 25, 2016

(54) VORTEX GENERATORS ALIGNED WITH TRAILING EDGE FEATURES ON WIND TURBINE BLADE

(71) Applicant: Siemens Aktiengesellschaft, München (DE)

(72) Inventors: John M. Obrecht, Louisville, CO (US); Arni T. Steingrimsson, Erie, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 402 days.

(21) Appl. No.: 14/251,943

(22) Filed: Apr. 14, 2014

(65) Prior Publication Data
US 2015/0292476 A1    Oct. 15, 2015

(51) Int. Cl.
*F03B 3/12*     (2006.01)
*F03D 1/06*     (2006.01)

(52) U.S. Cl.
CPC ........... *F03D 1/0633* (2013.01); *F03D 1/0675* (2013.01); *F05B 2240/122* (2013.01); *F05B 2250/181* (2013.01); *F05B 2250/183* (2013.01); *F05B 2260/96* (2013.01); *Y02E 10/721* (2013.01)

(58) Field of Classification Search
CPC .................. F05D 2240/122; F05D 2240/304; F05D 2250/18; F05D 2260/96; F05D 2250/181; F05D 2250/183; F03D 1/0633; F03D 1/0675; Y02E 10/721
See application file for complete search history.

(56) References Cited

U.S. PATENT DOCUMENTS

| | | |
|---|---|---|
| 3,578,264 A | 5/1971 | Kuethe |
| 4,655,419 A | 4/1987 | van der Hoeven |
| 4,813,466 A * | 3/1989 | Forsyth ................. B60C 27/20 152/179 |
| 4,830,315 A | 5/1989 | Presz, Jr. et al. |
| 5,058,837 A | 10/1991 | Wheeler |
| 5,074,376 A * | 12/1991 | Powell ..................... B63H 1/28 181/277 |
| 5,088,665 A | 2/1992 | Vijgen et al. |
| 7,059,833 B2 | 6/2006 | Stiesdal et al. |
| 7,293,959 B2 | 11/2007 | Pedersen et al. |

(Continued)

FOREIGN PATENT DOCUMENTS

| | | | |
|---|---|---|---|
| CN | 201461226 U | 5/2010 | |
| DE | 102006043462 A1 * | 3/2008 | ........... B64C 21/025 |

(Continued)

OTHER PUBLICATIONS

Machine Translation of DE102006043462A1 from EPO website (retrieved Jul. 2016).*

(Continued)

*Primary Examiner* — Jessica Cahill

(57) ABSTRACT

A wind turbine blade (80, 82) having a spanwise series of vortex generators (26, 28, 26P, 28P, 64, 66) and having a trailing edge (42) defining a waveform. The vortex generators are aligned with a predetermined position or phase (44, 46) of a respective period of the trailing edge waveform. Each vortex generator may be designed to create a vortex (27, 29) that crosses the trailing edge at an angle of less than 30 degrees from parallel to the trailing edge. The blade may include alternating ridges (52) and troughs (54) that end at the waveform trailing edge. A front end of each trough may form a V-shaped drop-off in the suction side of the blade that forms a pair (64, 66) of vortex generators to create counter-rotating vortices within the trough that entrain energy to the bottom of the trough.

13 Claims, 7 Drawing Sheets

(56) References Cited

U.S. PATENT DOCUMENTS

| | | |
|---|---|---|
| 7,604,461 B2 | 10/2009 | Bonnet |
| 7,914,259 B2 | 3/2011 | Godsk |
| 8,083,488 B2 | 12/2011 | Fritz |
| 8,430,638 B2 * | 4/2013 | Drobietz ............... F03D 1/0633 416/132 B |
| 8,523,515 B2 * | 9/2013 | Drobietz ............... F03D 1/0675 415/119 |
| 8,834,127 B2 * | 9/2014 | Giguere ............... F03D 1/0633 416/228 |
| 2009/0074585 A1 | 3/2009 | Koegler et al. |
| 2011/0142673 A1 | 6/2011 | Fang et al. |
| 2013/0149162 A1 | 6/2013 | Smith et al. |

FOREIGN PATENT DOCUMENTS

| | | | | |
|---|---|---|---|---|
| DE | 102010026588 A1 | * | 1/2012 | ........... F03D 1/0641 |
| FI | EP 2270312 A1 | * | 1/2011 | ............. B64C 23/06 |
| JP | 2003254225 A | * | 9/2003 | |
| WO | 2014048581 A1 | | 4/2014 | |

OTHER PUBLICATIONS

Matthew F. Barone, "Survey of Techniques for Reduction of Wind Turbine Blade Trailing Edge Noise", SAND20011-5252, Aug. 2011, all pages, Sandia National Laboratories, U.S.

\* cited by examiner

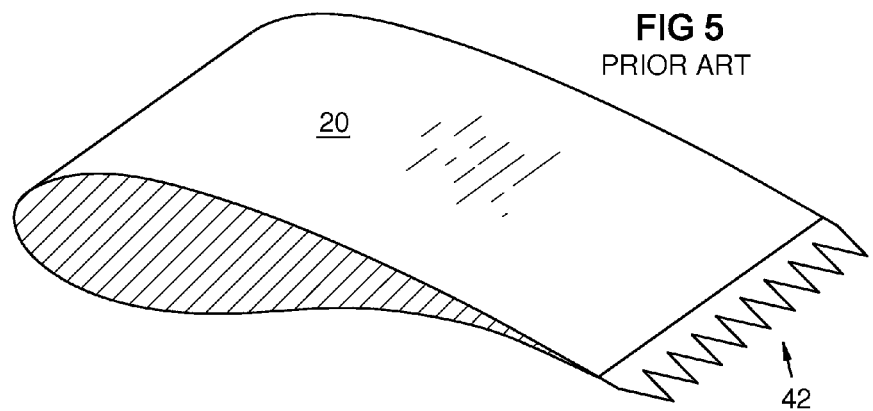
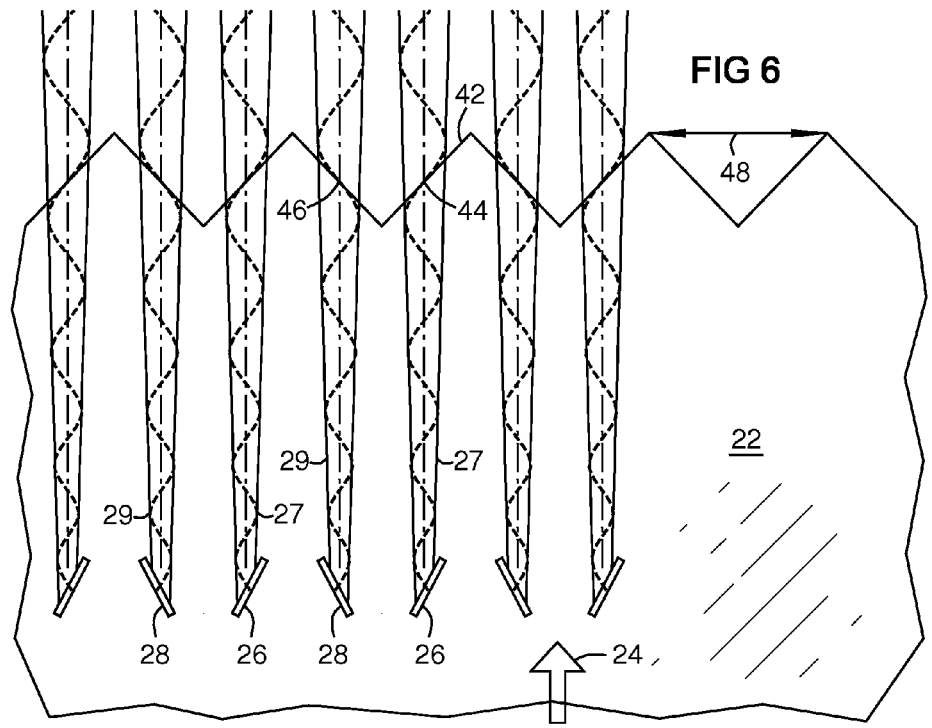

FIG 7
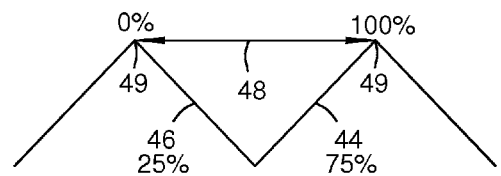
FIG 8
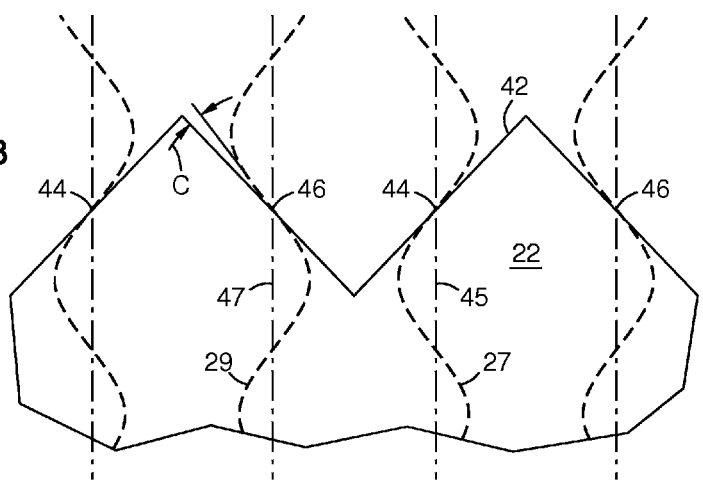
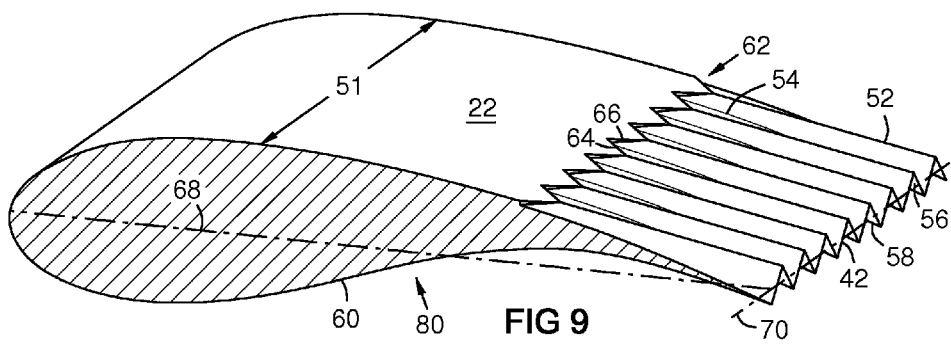
FIG 9

Suction side

42 Trailing edge serration
54 Trough
52 Ridge
52 Ridge
29 Vortex
27 Vortex
66 Sunken VG
64 Sunken VG Pressure side

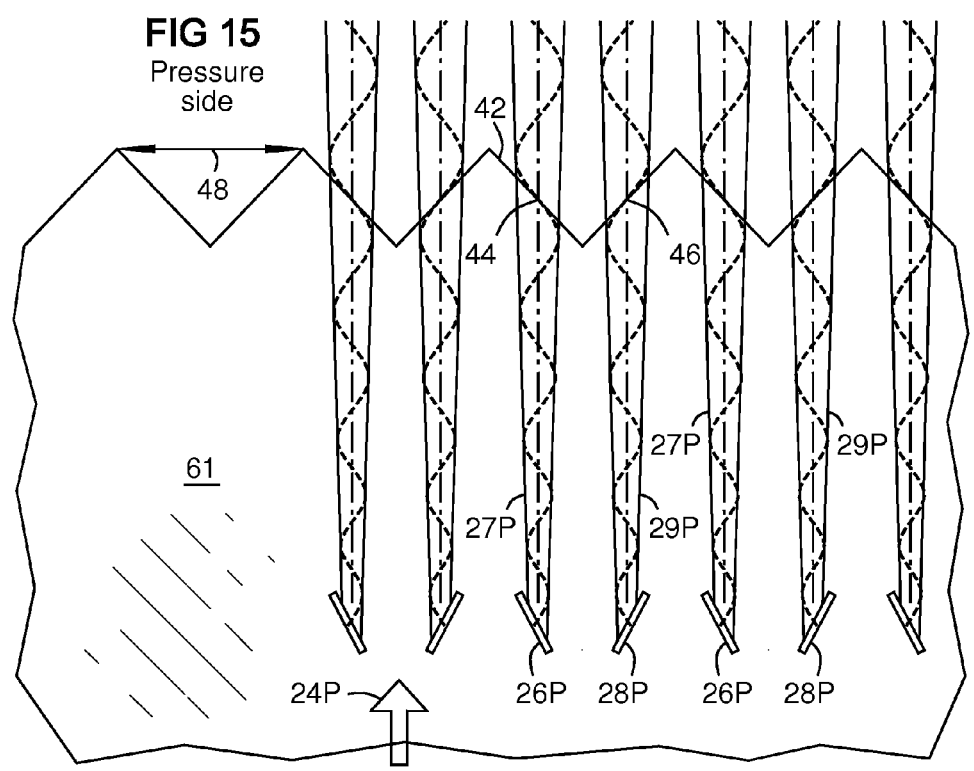

VORTEX GENERATORS ALIGNED WITH TRAILING EDGE FEATURES ON WIND TURBINE BLADE

FIELD OF THE INVENTION

The invention relates generally to the field of wind turbines, and more particularly to an apparatus for noise reduction and aerodynamic enhancement of an airfoil of a wind turbine blade

BACKGROUND OF THE INVENTION

Noise limitation design criteria reduce the efficiency and maximum size of wind turbines because the blade tip speed must be reduced to limit noise, thus reducing the turbine's performance capacity. A major component of wind turbine noise is trailing edge aerodynamic noise (Matthew F. Barone, "Survey of Techniques for Reduction of Wind Turbine Blade Trailing Edge Noise", Sandia National Laboratories, SAND20011-5252, August 2011, page 8). Trailing edge noise can be reduced by trailing edge serrations, as illustrated in FIG. 5 herein, which reduce the abruptness of the acoustic impedance mismatch between the merging suction side and pressure side flows at the trailing edge.

Vortex generators are mounted on the suction side of an airfoil to induce vortices that entrain kinetic energy from the bulk airflow into the boundary layer flow immediately against the suction side surface. Energizing of the boundary layer delays flow separation on the airfoil and allows higher angles of attack without stall, thus allowing a wider range of operating configurations and higher overall efficiency. However, vortex generators can add noise and drag in some conditions

BRIEF DESCRIPTION OF THE DRAWINGS

The invention is explained in the following description in view of the drawings that show

FIG. 5 is a perspective view of a prior art wind turbine blade airfoil with a serrated trailing edge.

FIG. 6 is a plan view of a portion of a wind turbine blade with vortex generators in chordwise alignment with predetermined phases of a waveform trailing edge according to aspects of an embodiment of the invention.

FIG. 7 illustrates a wave period and selected phases of a waveform trailing edge.

FIG. 8 is a plan view of a portion of a wind turbine blade with vortices aligned with predetermined phases of a waveform trailing edge FIG. 9 is a perspective view of a wind turbine blade airfoil with sunken vortex generators formed at the beginning of troughs that lead to a waveform trailing edge

FIG. 15 shows a pressure side portion of the blade directly below the suction side portion of FIG. 6 in an embodiment with respective pressure side vortex generators

DETAILED DESCRIPTION OF THE INVENTION

Figure 1:
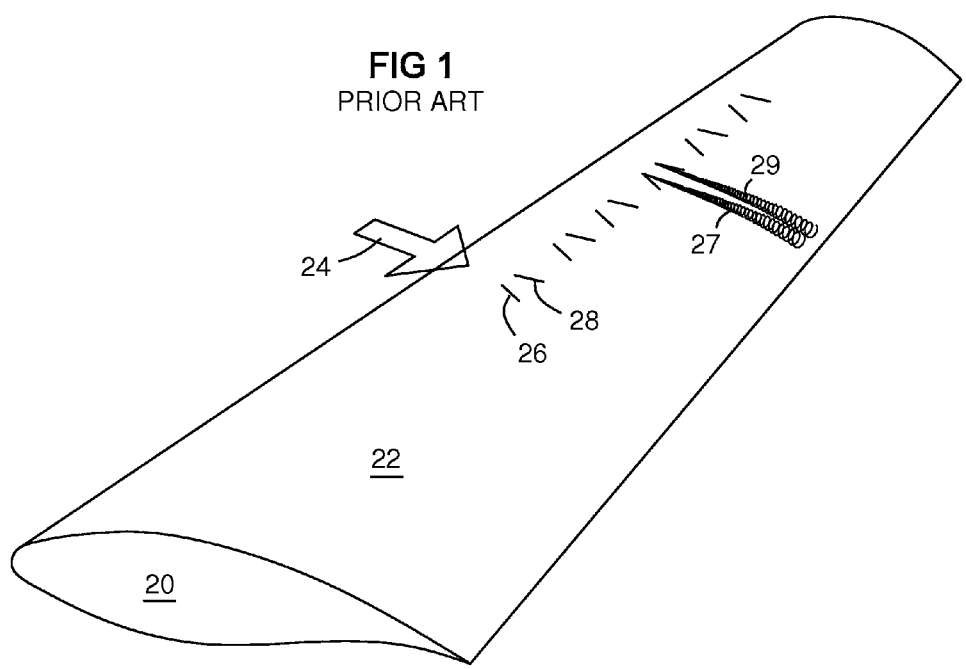
FIG. 1 is a perspective view of a prior art wind turbine blade with vortex generators

FIG. 1 shows a prior art wind turbine blade 20 with a suction side aerodynamic surface 22 on which is mounted a spanwise row of paired vortex generators 26, 28 that create respectively counter-rotating vortices 27, 29 in the relative airflow 24 These vortices entrain kinetic energy from the relative airflow outside the boundary layer into the boundary layer, which delays or prevents flow separation from the aerodynamic surface 22.

Figure 2:
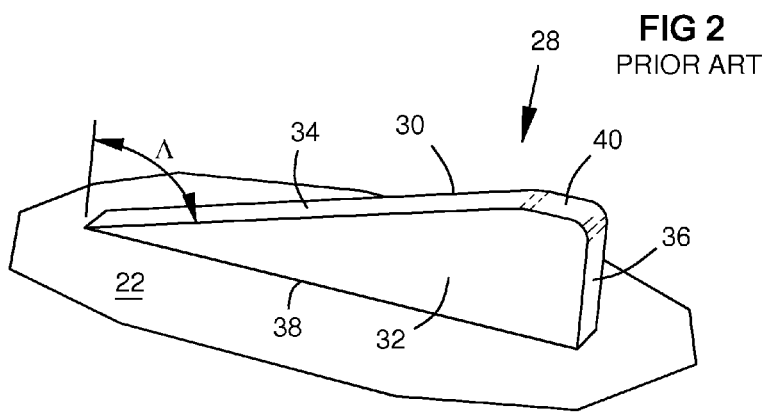
FIG. 2 is a perspective view of the vortex generator of FIG. 1.

FIG. 2 shows a vortex generator (VG) 28, which is a small airfoil extending from the larger aerodynamic surface 22 of the wind turbine blade 20. The VG has a pressure side 30 (hidden), suction side 32, leading edge 34, trailing edge 36, a root portion 38 attached to the larger aerodynamic surface, and a distal portion or tip 40. Such foils are commonly triangular or delta-shaped plates as shown, with a leading edge sweep angle A, such as 50-80 degrees.

Figure 3:
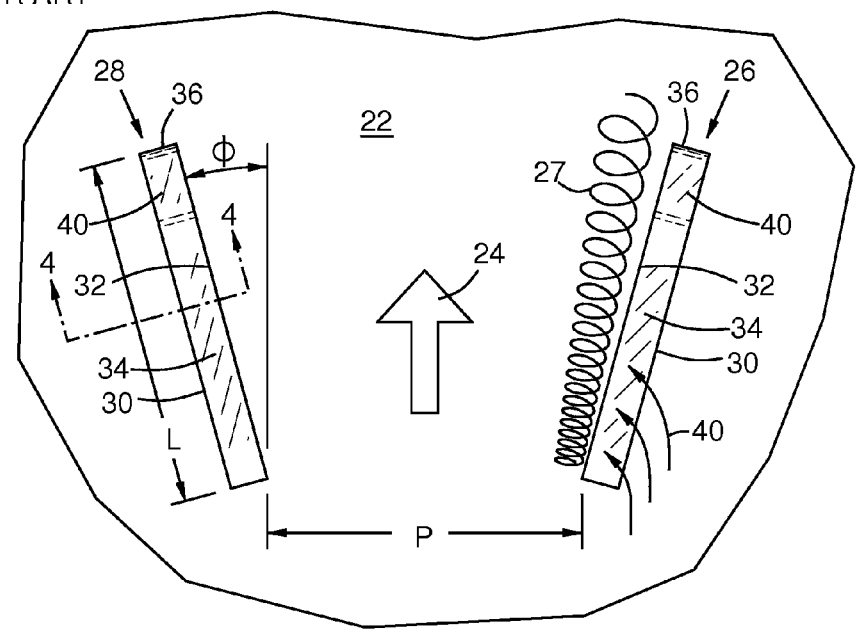
FIG. 3 is a top view of a pair of diverging vortex generators of FIG. 1.

FIG. 3 is a top view of a pair of diverging vortex generators 26, 28, separated by a distance called a pitch P. Each VG is a foil with a length L and an angle of incidence $\phi$ relative to the relative airflow 24. An incidence angle $\phi$ such as 10-40 degrees creates a pressure difference between the pressure and suction sides of the VG. The combination of high incidence angle $\phi$ and high sweep angle $\lambda$ (FIG. 2) promotes flow from the pressure side 30 to the suction side 32 of the VG As this local flow 40 wraps around the VG leading edge 34, it rolls into a vortex 27.

Figure 4:
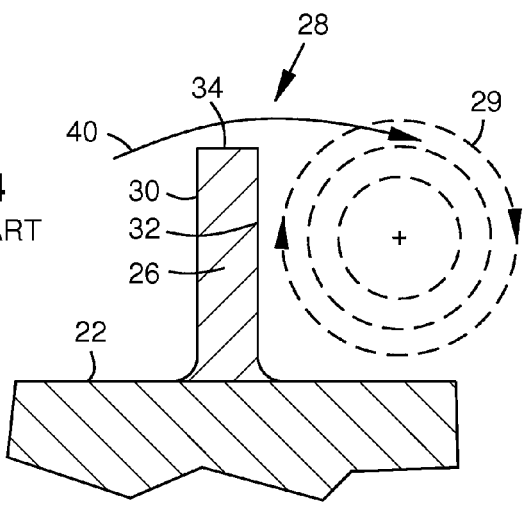
FIG. 4 is a sectional view of a vortex generator taken along line 4-4 of FIG. 3.

FIG. 4 is a sectional view of the VG 28 of FIG. 3 taken along line 4-4, showing a vortex 29 that is not illustrated in FIG. 3.

FIG. 5 is a perspective view of a wind turbine blade airfoil 20 with a serrated trailing edge 42 The serrations reduce trailing edge noise in some conditions.

The inventors have innovatively recognized that coordinated alignment between vortex generators and repeating trailing edge features such as serrations can provide additive benefits and synergy. One embodiment of this concept is illustrated in FIG. 6, which is a plan view of a spanwise sequence of pairs of alternately angled first and second vortex generators 26, 28 on the suction side 22 of an airfoil. The trailing edge 42 is serrated, forming a waveform profile in this view, such as a triangular, sinusoidal, or trapezoidal waveform. A wave period 48 is shown Each VG 26, 28 is designed to generate a vortex 27, 29 that crosses the waveform trailing edge 42 at a predetermined phase 44, 46 of the waveform Dashed lines indicate the path of a molecule of air in the airflow 24 flowing over the suction side 22 within a vortex as seen in this 2-dimensional view.

The first vortices 27 may cross the waveform at a first common phase 44 thereof. The second vortices 29 may cross the waveform at a second common phase 46 thereof "Common" phase means a phase of alignment that is common to the VGs of a given series. For example alignment with phase 44 is common to the first vortices 27 based on chordwise alignment of the first VGs 26. Alignment with phase 46 is common to the second vortices 29 based on chordwise alignment of the second VGs 28. "Chordwise alignment" herein means substantially aligned with a chord, and especially alignment with the relative airflow 24, which may be influenced by axial induction and radial pumping The invention is not limited to pairs of alternately angled VGs. The VGs may all have the same angle in some embodiments, or more than two angles in other embodiments However, in some embodiments, each series of VGs of a given angle may have a predetermined common phase of chordwise alignment with the waveform trailing edge 42

FIG. 7 shows a wave period 48 of the trailing edge waveform of FIG. 6. A period is defined between any two consecutive corresponding points on a waveform—for example between two adjacent peaks 49 or two adjacent valleys. The phase of a waveform is a proportion of a period, such as a percentage thereof, or alternately an angle thereof when waveform is sinusoidal. The illustrated phases 44 and 46 are shown by example as 75% and 25% respectively of the indicated period 48.

FIG. 8 is a plan view of a portion of a serrated trailing edge 42 with vortices 27, 29 aligned with serrations in accordance with an aspect of the invention. The trailing edge crossing points of the vortices 27, 29 may be defined by the crossing points of vortex center lines 45, 47. These centerlines may be determined by placement of the respective VGs 26, 28 (FIG. 6) aligned in a relative airflow direction with a respective phase 44, 46 of the waveform Each vortex generator may be designed to produce a downstream vortical flow that crosses the trailing edge at an angle C of less than 30 degrees from parallel with the trailing edge, or less than 20 degrees Such a small crossing angle reduces the abruptness of change in acoustic impedance between the suction side and pressure side flows as they merge at the trailing edge. This reduces the intensity of acoustic scattering due to the impedance mismatch, thus reducing noise and drag.

FIG. 9 is a perspective view of a blade airfoil 80 with a spanwise dimension 51. It has an aft portion with alternating chordwise ridges 52 and troughs 54 on the suction side 22 It also has opposed troughs 56 and ridges 58 on the pressure side 60 The pressure and suction side ridges and troughs nest at the trailing edge 42, to form a waveform as viewed from behind. A spanwise sequence 62 of sunken vortex generators 64, 66 is formed by drop-offs at the upstream ends of the troughs 54 on the suction side surface 22 These VGs do not have a pressure side or leading edge, so they create smoother, quieter vortices and less drag compared to prior VGs They generate counter-rotating vortices that progress downstream in the suction side troughs 54 as later shown A chord line 68 may be defined from the leading edge to a zero line 70 midway between the peaks and valleys of the waveform trailing edge 42.

Figure 10:
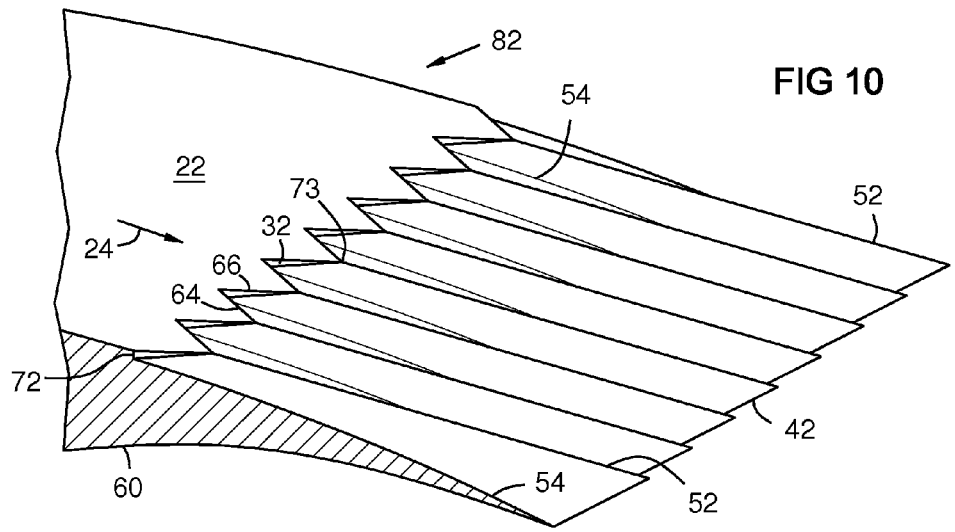
FIG. 10 is a perspective view of a portion of a wind turbine blade with sunken vortex generators beginning at troughs leading to an oblique trailing edge with a waveform profile in both a top view and a back view.

FIG. 10 is a perspective view of an aft portion of a blade airfoil 82 with alternating ridges 52 and troughs 54 aligned with the relative airflow 24, and ending in a trailing edge 42 having a waveform profile as viewed from behind and as viewed from above. The trailing edge 42 may be disposed in a plane that is oblique to the chord line. This results in trailing edge serrations as viewed from above A spanwise sequence of sunken vortex generators 64, 66 is formed by drop-offs 72 at the upstream ends of the troughs 54 on the suction side surface 22 of the blade 82. These VGs may have a suction side 32 with a top edge flush with the suction side 22 of the blade The VGs have no pressure side, and thus no leading edge They may taper to a point 73 at the ridge 52. Thus, they have no trailing edge. This means they have no surfaces other than the vortex-generating surface 32, thus minimizing drag and noise Alternately, standard vortex generators may be used in troughs that merge smoothly forward into the suction side surface 22

Figure 11:
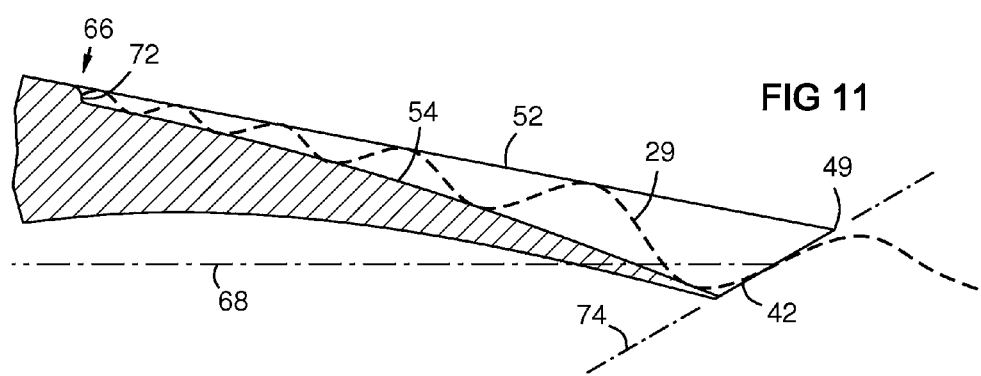
FIG. 11 is a side sectional view of a portion of an aft portion wind turbine blade taken through the center of a trough of FIG. 10.

FIG. 11 is a transverse sectional view of the blade 82 taken through a trough 54 of FIG. 10 The trailing edge 42 is disposed in a plane 74 that is oblique to the chord line 68, resulting in serrations as viewed from above. For example, the oblique plane 74 may lean away from the suction side 22 by at least 45 degrees relative to a plane normal to the chord line 68. A sunken VG 66 creates a vortex 29 in the trough. The VG may be designed to create a vortex 29 that may extend in diameter substantially to the ridge 52 over at least most of a length of the ridge 52, such as over at least 75% of the length of the ridge 52, thus substantially filling the trough 54. This entrains kinetic airflow energy to the bottom of the trough, while avoiding cross-flow distortion of the vortex. This filling of the trough may provide lift advantages similar to a flatback airfoil, but with less drag and noise penalty, especially if the vortical flow crosses the trailing edge at less than 30 degrees The shape and direction of the vortex 29 can be designed by the shape and angle of the VG 66. For example, the VG may have a drop-off 72 with a rounded edge to cause a smooth roll-over of airflow into a vortex 29 that hugs the surface of the trough 54 In some embodiments, the VG may be designed to produce a vortical flow 29 that crosses the trailing edge 42 at an angle of less than 30 degrees from parallel therewith, or less than 20 degrees.

Figure 12:
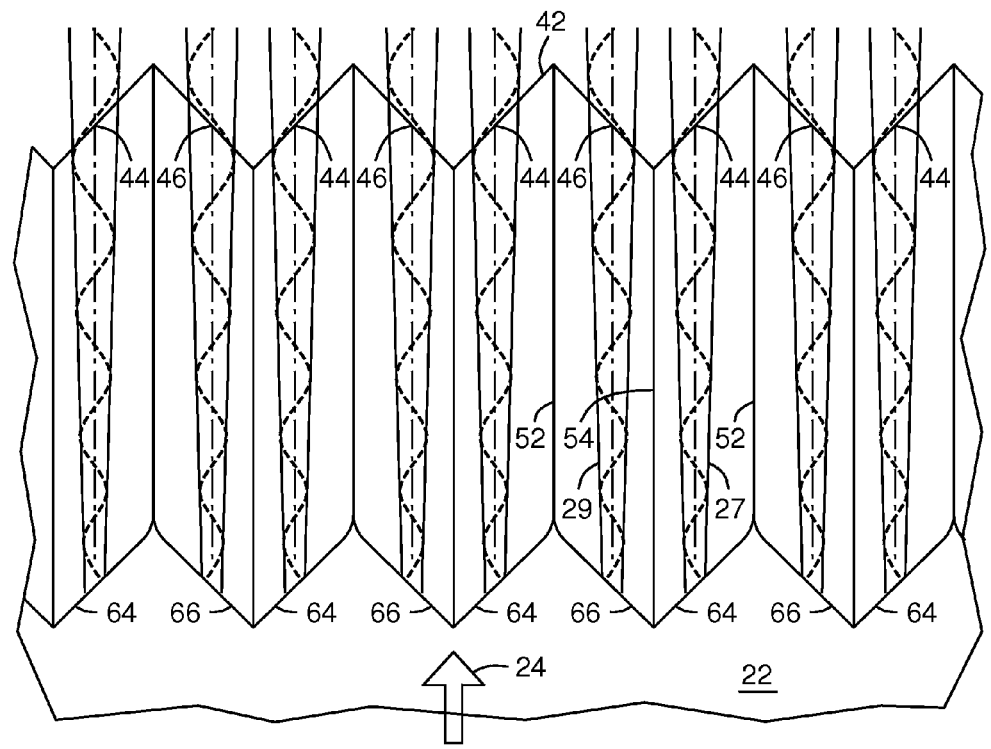
FIG. 12 is a plan view of a portion of a wind turbine blade with sunken vortex generators at the beginning of troughs leading to a waveform trailing edge.

FIG. 12 is a plan view of a spanwise sequence of alternately angled first and second sunken vortex generators 64, 66 on the suction side 22 of an airfoil at the front of chordwise troughs 54 therein. The trailing edge 42 is serrated, forming a waveform profile in this view, such as a triangular, sinusoidal, or trapezoidal waveform. Each VG 26, 28 is designed to generate a respective vortex 27, 29 that crosses the waveform at a predetermined phase 44, 46. Dashed lines indicate the path of an airflow molecule within each vortex as seen in this 2-dimensional view.

Figure 13:
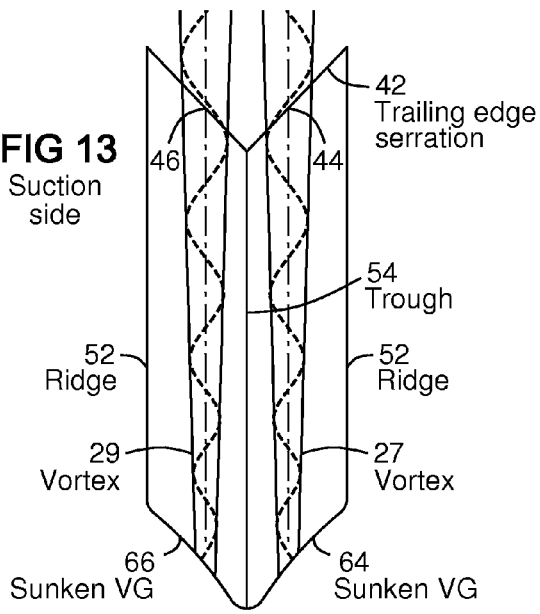
FIG. 13 is a plan view of a single trough illustrating sunken vortex generators with convex suction side surfaces.

FIG. 13 is a plan view of a single trough 54 between two ridges 52 The vortex generators may be convex as shown to shed the vortices 27, 29 earlier than if they were straight, thus shedding the vortices closer to the center of the trough 54.

Figure 14:
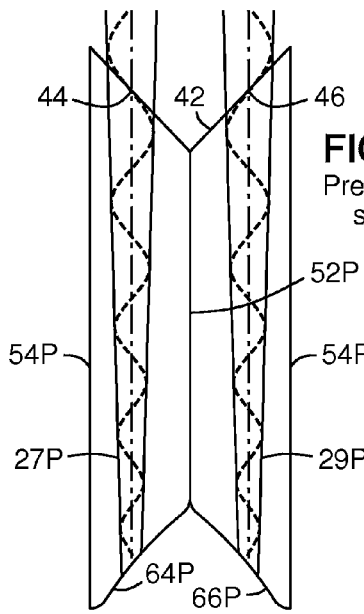
FIG. 14 shows a pressure side portion of the blade directly below the suction side trough of FIG. 13 in an embodiment with a pressure side ridge opposite the suction side trough.

FIG. 14 shows a pressure side portion of the blade directly below the suction side trough of FIG. 13, in an embodiment with a pressure side ridge 52P opposite the suction side trough 54 of FIG. 13, and pressure side troughs 54P opposite the suction side ridges 52 of FIG. 13 Pressure side vortex generators 64P, 66P may be designed to create respective pressure side vortices 27P, 29P within the pressure side troughs 54P with vortical flows that cross the trailing edge 42 at a predetermined phase 44, 46 of the waveform trailing edge 42 at an angle of less than 30 degrees from parallel with the trailing edge, or less than 20 degrees and, in some embodiments, in the same direction as the respective suction side vortical flows 27, 29 of FIG. 13. This causes the pressure and suction side flows to merge smoothly which may have at least an acoustic advantage Other embodiments may have the pressure and suction side vortex generators positioned so that the flows exiting the trailing edge from the pressure and suction sides are at a specific predetermined angle relative to each other at respective points along the trailing edge. Moreover, the relative alignment of the pressure and suction side flows exiting the trailing edge may be varied along the spanwise length of the trailing edge. Sunken vortex generators are shown in this embodiment In another embodiment the pressure side vortex generators may be surface mounted FIG. 15 shows a pressure side 61 directly below the suction side portion of FIG. 6, in an embodiment with pressure side vortex generators 26P, 28P designed to create respective pressure side vortices 27P, 29P with vortical flows that cross the trailing edge 42 at a predetermined phase 44, 46 of the waveform trailing edge 42 at an angle of less than 30 degrees from parallel with the trailing edge, or less than 20 degrees, and in the same direction as the respective suction side vortical flows 27, 29 of FIG. 6. This causes the pressure and suction side flows to merge smoothly. A pressure side relative airflow 24P is shown.

While various embodiments of the present invention have been shown and described herein, it will be obvious that such embodiments are provided by way of example only Numerous variations, changes and substitutions may be made without departing from the invention herein. Accordingly, it is intended that the invention be limited only by the spirit and scope of the appended claims.

The invention claimed is:

1. A wind turbine blade comprising
   a predetermined alignment of vortex generating features with trailing edge features relative to an airflow path,
   the trailing edge features comprise a trailing edge and a series of chordwise suction side troughs displaying a waveform profile as viewed from behind the trailing edge,
   the vortex generating features comprise, on a suction side of the blade and upstream from the trailing edge, a spanwise sequence of pairs of first and second vortex generators designed to produce respective first and second respectively counter-rotating vortices that crosses the trailing edge,
   wherein each of the first vortex generators is aligned chordwise with a common first phase of the waveform profile, and
   wherein each of the second vortex generators vortex is aligned chordwise with a common second phase of the waveform profile.

2. The wind turbine blade of claim 1, wherein:
   each of the first and second vortex generators is designed to produce a downstream vortical flow that crosses the trailing edge at an angle of less than 30 degrees from parallel with the trailing edge.

3. The wind turbine blade of claim 1, wherein:
   the vortex generating features comprise a spanwise sequence of alternately angled vortex generators on a suction side of the blade designed to produce a spanwise sequence of pairs of first and second respectively alternately counter-rotating vortices downstream thereof.

4. The wind turbine blade of claim 1, wherein each of the first and second the vortex generators are designed to create the vortices to extend in diameter to a height of the trough over at least 75% of a length of the trough.

5. The wind turbine blade of claim 1, wherein each of the suction side and pressure side vortex generators is designed to produce a respective downstream vortical flow that crosses the trailing edge at an angle of less than 30 degrees from parallel therewith.

6. The wind turbine blade of claim 1, wherein
   each of the vortex generators is designed to produce a downstream vortical flow that crosses the trailing edge at an angle of less than 20 degrees from parallel with the trailing edge.

7. The wind turbine blade of claim 1, wherein each first and second vortex generators is sunken into the suction side of the blade, with a top edge of the respective vortex generator being flush with the suction side of the blade, the respective vortex generator having no pressure side surface.

8. The wind turbine blade of claim 7, wherein the first and second vortex generators suction side is convex as seen in a plan view of the blade.

9. The wind turbine blade of claim 7, wherein the first and second vortex generators suction side tapers to a point at an adjacent ridge of the respective trough, the vortex generator having no trailing edge.

10. The wind turbine blade of claim 7, wherein
    the respective vortex generator having no leading edge.

11. The wind turbine blade of claim 7, wherein
    the trailing edge comprising a serrations as viewed from above.

12. A wind turbine blade comprising:
    a trailing edge with a waveform profile;
    a first spanwise series of vortex generators on a suction side of the blade, wherein each vortex generator of the first spanwise series is aligned chordwise with a common first phase of the waveform profile;
    a second spanwise series of vortex generators, wherein each vortex generator of the second spanwise series is aligned chordwise with a common second phase of the waveform profile, wherein the waveform profile of the trailing edge is formed by a series of chordwise suction side troughs and an opposed nested series of chordwise pressure side ridges; and
    a plurality of first and second pressure side vortex generators on a pressure side of the blade, each first pressure side vortex generator aligned chordwise with the common first phase of the waveform profile, each second pressure side vortex generator aligned chordwise with the common second phase of the waveform profile, and each pressure side vortex generator designed to create a vortical flow that crosses the trailing edge at an angle of less than 20 degrees.

13. A wind turbine blade comprising:
    a trailing edge with a waveform profile;
    a first spanwise series of vortex generators on a suction side of the blade, wherein each vortex generator of the first spanwise series is aligned chordwise with a common first phase of the waveform profile; and
    a second spanwise series of vortex generators, wherein each vortex generator of the second spanwise series is aligned chordwise with a common second phase of the waveform profile, wherein the waveform profile of the trailing edge is formed by a series of chordwise suction side troughs and an opposed nested series of chordwise pressure side ridges,
    wherein each trough comprises a front end comprising a V-shaped drop-off from the suction side of the blade, sides of the V-shaped drop-offs forming respective pairs of vortex generators generating respective pairs of counter-rotating vortical flows within the respective troughs.

* * * * *